United States Patent
Dickey

(10) Patent No.: US 7,013,113 B2
(45) Date of Patent: Mar. 14, 2006

(54) METHOD AND APPARATUS FOR CO-CHANNEL INTERFERENCE MEASUREMENTS AND INTERFERENCE COMPONENT SEPARATION BASED ON STATISTICAL SIGNAL PROCESSING IN DRIVE-TEST AREA

(75) Inventor: Sergey L. Dickey, Fairfax, VA (US)

(73) Assignee: PCTEL Maryland, Inc., Germantown, MD (US)

( * ) Notice: Subject to any disclaimer, the term of this patent is extended or adjusted under 35 U.S.C. 154(b) by 294 days.

(21) Appl. No.: 10/625,938

(22) Filed: Jul. 24, 2003

(65) Prior Publication Data

US 2004/0166809 A1    Aug. 26, 2004

Related U.S. Application Data

(60) Provisional application No. 60/398,445, filed on Jul. 25, 2002.

(51) Int. Cl.
   *H04B 17/00* (2006.01)
(52) U.S. Cl. ................... 455/67.16; 455/67.11; 455/67.13; 455/456.1; 455/457; 455/446
(58) Field of Classification Search ............ 455/67.11, 455/456.1, 457, 114.2, 115.2, 115.3, 226.1, 455/242.1, 446, 456, 296, 67.16, 67.13
   See application file for complete search history.

(56) References Cited

U.S. PATENT DOCUMENTS

| | | | |
|---|---|---|---|
| 5,561,841 A * | 10/1996 | Markus | 455/446 |
| 5,926,762 A | 7/1999 | Arpee et al. | |
| 6,324,382 B1 | 11/2001 | Dolder | |
| 6,336,035 B1 * | 1/2002 | Somoza et al. | 455/446 |
| 6,349,207 B1 | 2/2002 | Monot et al. | |
| 6,442,393 B1 * | 8/2002 | Hogan | 455/456.5 |
| 6,760,599 B1 * | 7/2004 | Uhlik | 455/525 |
| 2001/0034208 A1 | 10/2001 | Kline et al. | |
| 2002/0155816 A1 * | 10/2002 | Fodor et al. | 455/67.1 |

* cited by examiner

*Primary Examiner*—Nick Corsaro
*Assistant Examiner*—Minh D. Dao
(74) *Attorney, Agent, or Firm*—Roberts Abokhair & Mardula, LLC

(57) ABSTRACT

A method and apparatus for uniquely identifying signal sources in a multisource signal. True levels of signal components transmitted by each of the co-channel base stations in the area under test in a wireless network are measured and associated with the appropriate (originating) base station in presence of co-channel and adjacent-channel interference without interrupting service. The present invention is based on an "area-measurement" approach and relies on relative time-of-arrival (RTOA) measurements of the signal components impervious to the existence of the phase drift between the scanner and base stations.

22 Claims, 4 Drawing Sheets

METHOD AND APPARATUS FOR CO-CHANNEL INTERFERENCE MEASUREMENTS AND INTERFERENCE COMPONENT SEPARATION BASED ON STATISTICAL SIGNAL PROCESSING IN DRIVE-TEST AREA

CROSS REFERENCE TO RELATED APPLICATIONS

The present invention claims priority under 35 USC 119(e) from provisional application No. 60/398,445, filed Jul. 25, 2002. The provisional is incorporated herein by reference.

FIELD OF INVENTION

The present invention relates generally to the field of Time Division Multiple Access (TDMA) Cellular and Personal Communications System (PCS) networks. More particularly, the present invention relates to a method and apparatus for uniquely identifying signal sources in a multisource signal.

BACKGROUND OF THE INVENTION

It is well known that one of the major limitations in cellular and PCS wireless telephone networks is the so-called co-channel interference. In the case of TDMA networks, such as GSM or NADC (otherwise known as "IS-136"), the co-channel interference is mainly caused by the fact that the spectrum allocated to the system is reused multiple times ("frequency reuse"). The problem may be more severe, or less, depending on the reuse factor, but in all cases a signal, received by a handset, will contain not only the desired forward channel from the current cell, but also signals originating in more distant cells. If the interference from a distant cell causes a degradation of the ability of the handset to receive correctly the desired signal, it becomes important to identify the source of co-channel interference and measure the relative strength of interference relative to the desired signal.

It is also important when performing a drive test of a wireless system to be able to separate signals that are coming from different base stations. Two phenomena make such a separation difficult: co-channel interference and adjacent-channel interference. When several base stations transmit on the same frequency, there are areas in the coverage region where conventional methods of power measurement are impractical or difficult to use when one needs to measure power from each of the interfering stations. This is also true for the case when stations operate on adjacent channels in close proximity.

A number of methods are being used to achieve the goal of signal separation. For example, drive-testing (measuring signal strengths with a scanning mobile receiver on board a test vehicle) in a system where each of the sectors uses a single unique frequency is described in U.S. Pat. No. 5,926,762.

Methods based on the association of signals with transmitting base stations based on the ability to decode the so-called "color codes" (base stations' IDs) have also been used. If a color code can be detected, the signal is ascribed to the nearest base station with this ID. Since color codes cannot be decoded using conventional receivers or handsets in presence of strong interference (co-channel or adjacent-channel), more advanced techniques of signal separation have been devised for color-code decoding when a signal, or signal component, is masked by interference.

One such technique of associating signals with base stations involves joint-decoding of the constituent signal components with channel estimation for each of the signal paths involved (described in U.S. Pat. No. 6,324,382, assigned to Agilent Technologies, Inc.). This method relies on an accurate estimation of the transmission channel characteristics for signal paths from each of the base stations contributing to the mixture of interferers at the reception site. Under conditions where the residual error of signal estimation due to the limitations of the complexity of channel modeling exceeds the level of weaker signals (or even the weaker of the two signals) and taking into account the realistic constraints of hardware complexity, the detection of the color code is all but impossible. The underlying reason for this result is that the color code embedded into the signal does not possess redundancy above what is normal for any digital code in the signal (in traffic and control channels), so that there is no additional processing gain when decoding color codes (BSIC in the case of GSM). Apart from poor decoding performance in practice, devices based on this approach suffer from slow scanning performance.

Another approach, described in U.S. Pat. No. 6,349,207, uses directional antenna arrays and time-space diversity to tune in a serial manner to one spatial signal component at a time with the exclusion, or at least attenuation, of the rest of the signal components. When an acceptable signal-to-noise ratio for a given interfering component is obtained, it is possible to demodulate and decode the color code corresponding to the station that transmitted the isolated component. This process is assisted by the detection of the interfering components in the signal by using correlations with known patterns (training sequences) in the signal. Knowing the number of components facilitates the time-spatial filtering algorithm. Although the described method apparently achieves the goal of associating interfering signal components with color codes and even with base station locations (by using RTOA-based triangulation), this technique requires complex and expensive equipment.

Another approach to the task of signal-component separation and signal identification is described in U.S. patent application Ser. No. 09/795,225 filed Feb. 28, 2001. The Ser. No. 09/795,225 application is incorporated by reference herein, in its entirety, for all purposes. This approach is based on using correlation with known patterns in a signal (synchronization patterns and training sequences, for example), which yields a significant processing gain. This gain allows detection of the presence of an interfering component even when its level is substantially below the levels of interfering signals. Signal identification (i.e., association with transmitting stations) is based on the ability to track individual components during a drive test based on the knowledge of their respective times of arrival. By observing each of the detected components separately during the course of the drive test, one is able to relate the component to a geographical position where its contents, including the color code, can be easily and reliably determined. Then, by using the information logged in a data base for the whole life span of the component, all instances of the detection of this component are back-annotated with the BSIC value of the signal, or the name of the base station determined based on its geographical location at the moment of signal determination (being the closest station transmitting on the frequency channel when the component strength was at the maximum value).

The advantage of the correlation method is that it relies on a robust characteristic of the signal (correlation with a known pattern) that possesses processing gain. However, as the method relies on the ability to relate successive instances of the component correlations along the path of the vehicle from one area to an area in the proximity of the base station that emits this specific component, it cannot be advantageously utilized in presence of interruptions of coverage, when testing is done in several sessions over the course of several days, or when timing cannot be relied upon because of the relative drift between the carrier phase and that of the reference clock of a scanner.

What is needed is a means of signal-component identification for the described "area-measurement" (as opposed to the previously described "point-measurements") that is robust and reliable, allows interrupt and resume drive testing in multiple sessions, does not require accurate time measurements of the signal arrival time, and tolerates gaps in coverage along the path of the test vehicle.

SUMMARY OF THE INVENTION

The present invention a system and method for determining individual levels of signal components corresponding to control and traffic channels.

It is therefore an object of the present invention to separate a composite signal into its components and to identify source of each component.

It is a further object of the present invention to achieve signal component separation and identification using an area measurement technique.

It is still another object of the present invention to achieve signal component separation and identification wherein the area measurement technique allows for interrupt and resume drive testing in multiple sessions.

It is still a further object of the present invention to achieve signal component separation and identification wherein accurate measurements of the signal arrive time are not required It is a further object of the present invention to achieve signal component separation and identification wherein the gaps in coverage along drive testing path are tolerated.

These and other objectives of the present invention will become apparent from a review of the general and detailed descriptions that follow. True levels of signal components transmitted by each of the co-channel base stations in the area under test in a wireless network are measured and associated with the appropriate (originating) base station in presence of co-channel and adjacent-channel interference. This is done in a fully functional network without interrupting service. The present invention is based on the "area-measurement" approach and relies on relative time-of-arrival (RTOA) measurements of the signal components impervious to the existence of the phase drift between the scanner and base stations, as well as on the fact that all base stations are synchronized by the same core network and consequently do not drift appreciably relative to each other.

The processing algorithm of the present invention uses a histogram of relative signal delays for the whole area of measurement that comprises multiple cells to find the timing relations that are characteristic of the transmitting base stations in the area and are invariant for the duration of the test. This finding uses geographical relationships between the multitude of component-detection points on the map corresponding to each of the histogram peak and base station locations known either from a network data base, or determined empirically in the course of the drive test. The process of the present invention interprets each of the previously found (by using correlation with known patterns) signal components by their known relative mutual delays that correspond to those of the base stations. The final result is a geographical data base of signal components from each of the base stations working in the frequency channel that can be used to map coverage of each of the stations cleared from the interference of other co-channel and adjacent-channel stations. It is also possible to map co-channel and adjacent channel interference levels existing between specific stations and use this data base as an input to any frequency-planning and network-optimization software-based or manual process.

DETAILED DESCRIPTION OF THE INVENTION

The present invention may be embodied as a method for determining individual levels of signal components corresponding to control and traffic channels or as a device that implements the method.

Figure 1:
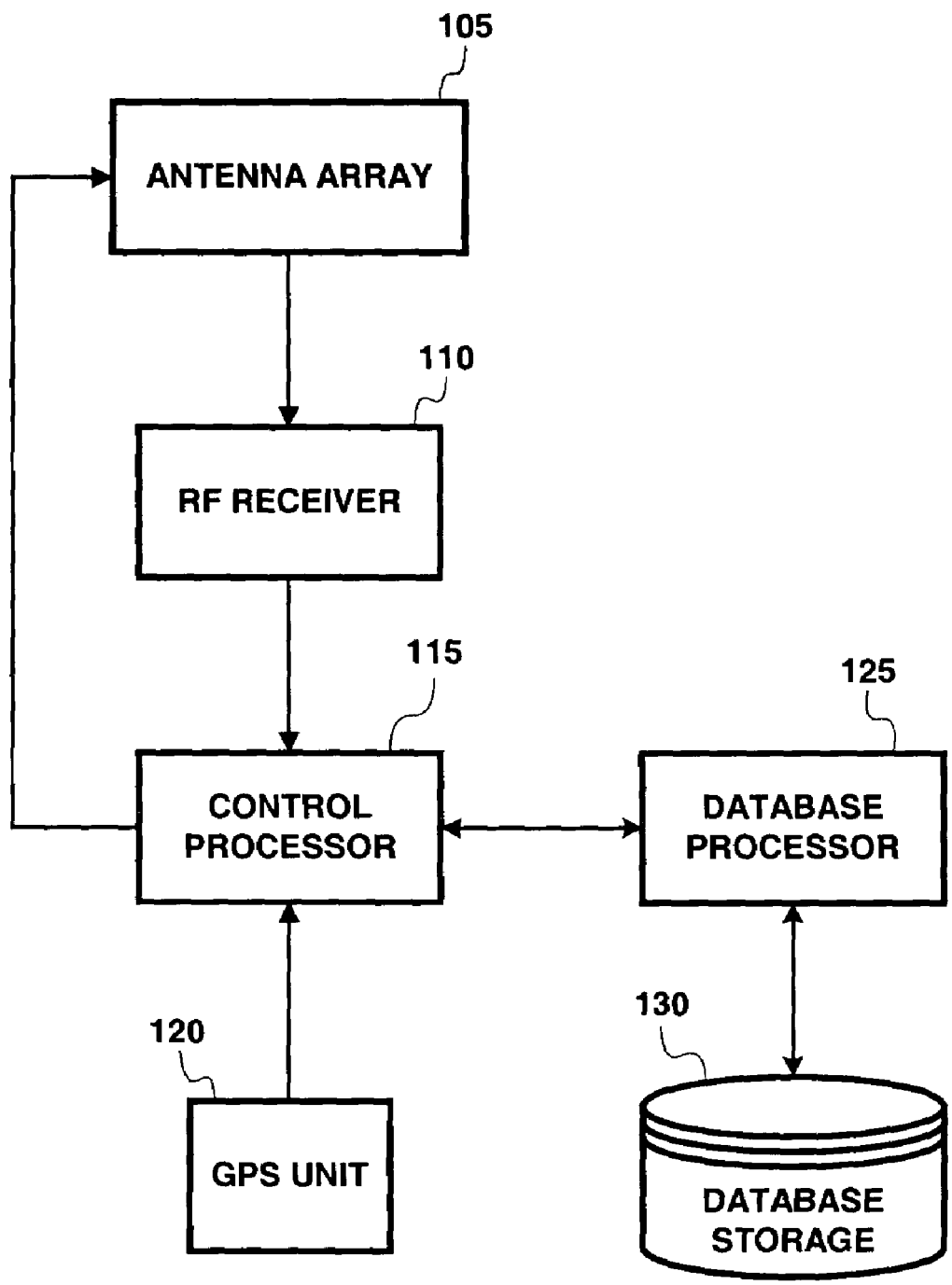
FIG. 1 illustrates a functional block diagram of an apparatus according to an embodiment of the present invention.

Referring to FIG. 1, a block diagram of an apparatus according to an embodiment of the present invention is illustrated. An RF receiver 110 produces a composite signal received via an antenna array 105. A control processor 115 receives RF data from the RF receiver 110 and coordinate data from the GPS receiver 120. The data to be recorded for each component at each measurement point is directed from the control processor 115 to the database processor 125 and stored in a data storage device 130. Alternatively, the invention is embodied so that the functions of the control processor 115 and the database processor 125 are merged into a single processor. Processors used with the present invention may be common Pentium™ type processors operating on Windows™ based software. An example of an RF receiver includes, but is not limited to a GSM multichannel scanner. The GPS may be an external unit, or may be integral with any of the other components.

The signal samples are obtained during a drive-test over a broad area that covers most of the interfering co-channel cells of interest. However, complete coverage without gaps is not required, since the processing of the signal samples is based on statistical averaging of the data.

Figure 2:
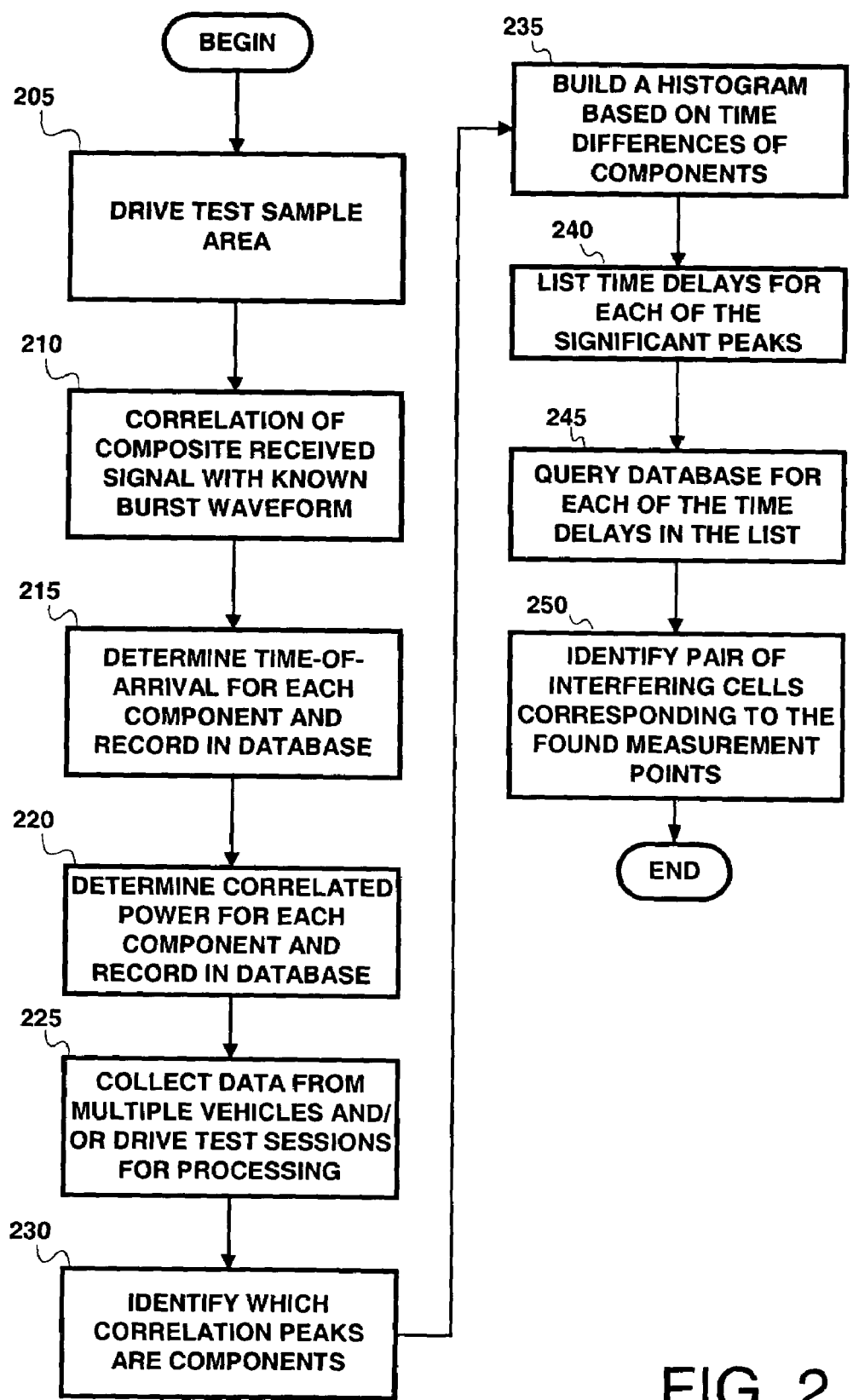
FIG. 2. illustrates a flowchart for a method according to an embodiment of the present invention for identifying a pair of interfering base stations.

Referring to FIG. 2, a flowchart of a method according to an embodiment of the present invention is illustrated.

A drive test of the whole area under review is performed with a scanning receiver (or multiple receivers using multiple vehicles) 205. Signal samples are collected and are correlated with a number of known signal patterns characteristic of the given specific communication network, both for traffic and control signals 210 on every frequency channel in a TDMA/FDMA system. The time of arrival of each of the decorrelated signal components (they correspond to each of the interferers present in the signal mix) is measured relative to the internal scanner clock and relative to the time window appropriate for the communication standard in question 215. For example, in the case of GSM, the appropriate time frame for an FCCH burst correlation that can be used to determine the levels of interference from BCCH channels, is, by way of example only and without limitation, a 10-frame window that ensures quasi-periodicity of the result, or, as another example and without limitation, a 51-frame multiframe that ensures true periodicity, but consumes more time (but yields a better dynamic range of the measurement). This correlation is flexible in the sense that by using more known bursts to correlate (or using any other way of providing longer integration time for the correlation result) one can achieve a higher dynamic range of the measurement with the benefits to be described later in this disclosure. The use of a time delay relative to the 51-frame time base of the receiver may be used to identify individual base stations.

The absolute correlated power of each detected signal component is also determined 220. The results of the measurements as described comprise the absolute levels of correlated power and relative time of arrival for each of the detected signal component for each of the measurement point together with the time of the measurement (derived from the GPS receiver 120, or a computer clock) and the geographical location of the point. The measurement points comprising these parameters are then stored in computer files or databases along with data collected from multiple vehicles and/or drive-test sessions for processing 225. In another embodiment of the present invention, the data from the test vehicles can be transmitted for storage and processing on-line using any communication means, after, or during the process of testing.

The collected measurement points are pre-processed depending on the correlation pattern used wherein certain correlation peaks are merged with other peaks, and their relative powers are averaged, based on certain timing relationships in the frame pattern. By way of example and not as a limitation, peaks are distinct only in terms of their timing taken modulo 10 frames for FCCH-correlated peaks in GSM. Other relationships may apply for other patterns.

The post-processing starts with the determination for each of the measurement points (i.e., a collection of component parameters as described previously) as to which correlation peaks represent actual signals or interferers, or alternatively, noise 230. This determination may be based on setting a threshold for relative power of the components, or merely on a fixed number of components allowed, for instance, the first (in relation to power) 5 components.

A histogram for the distribution of time differences between components is built 235. In one embodiment of the present invention, the first and second components are sorted in the descending relative-power order, but this is not meant as a limitation. In yet another embodiment of the present invention, histograms are built for multiple sub-areas instead of a single large area. This embodiment is preferred for larger test areas, as it does not muddle peaks with noise. The most significant (easily identifiable by a computer program or a human eye) peaks of this histogram correspond to the cases of interference between closely-spaced, or in some instances adjacent or overlapping, co-channel cells. They are found and recorded in a list that shows time delays for each of the significant peaks 240.

A data-base query for each of the time delays in the list, and its complement to the multiframe time period in the pattern, is made 245. This query returns the measurement points that have the first and the second peak, or signal component, delayed to each other (for example, without considering the sign of the time difference) by the value lying in a certain window around the list value. A pair of interfering cells is identified that corresponds to the found measurement points, and has the value of the time shift between each of the cells comprising the pair that was returned by the query 250. The identification is based on the spatial distribution of the returned interference points centered on the border line between the cells when they are adjacent, or approximately in the middle between the base stations and on the border of intermediate cells, where the cells are not adjacent. In difficult cases, where the area distribution of the points is ambiguous, several candidate pairs will be identified for subsequent analysis.

Figure 3:
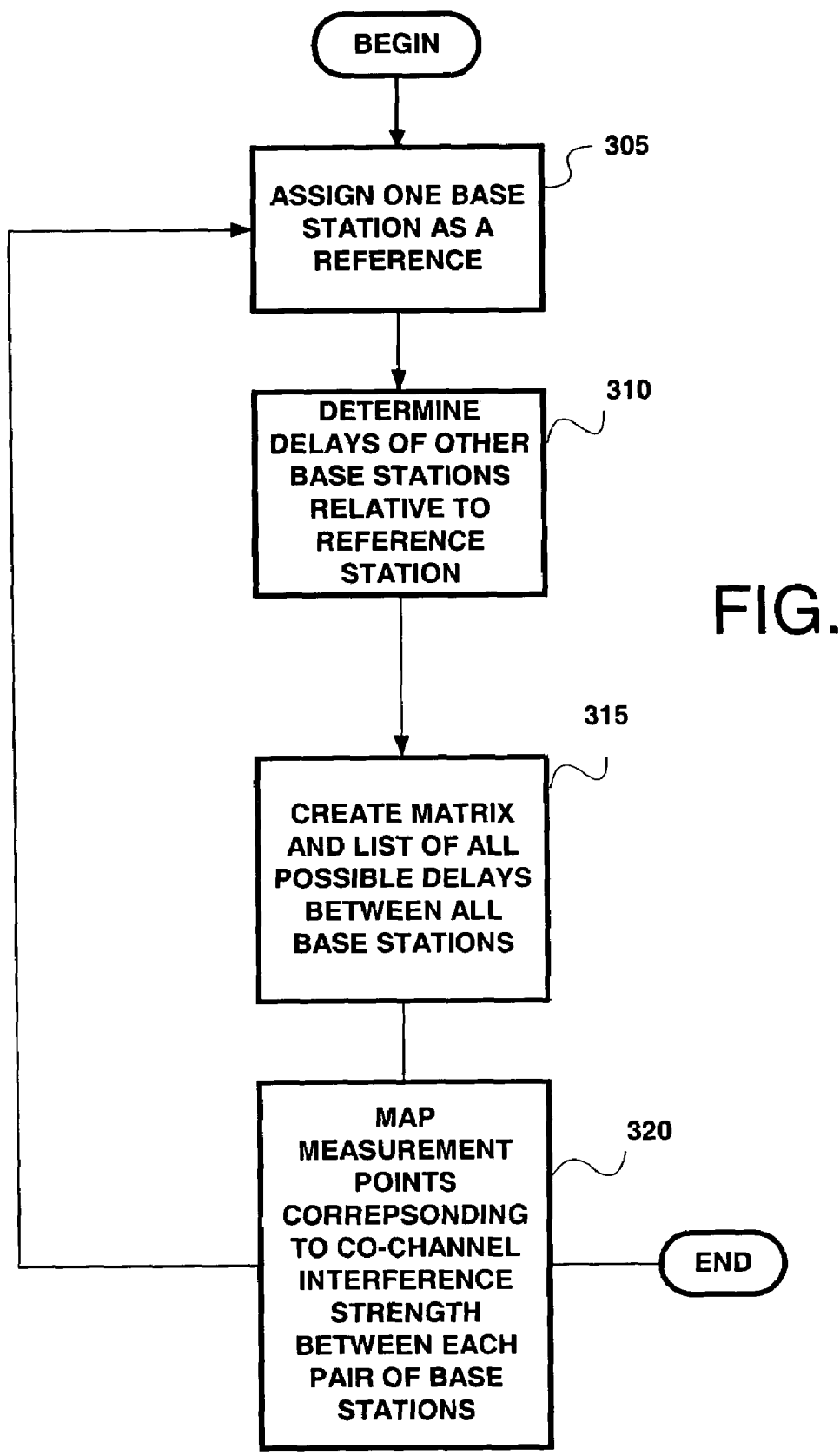
FIG. 3. illustrates a flowchart for a method according to an embodiment of the present invention for creating a map of interfering base stations.

Referring to FIG. 3, a flow chart of a method of another embodiment of the present invention is illustrated. The timing relationships between all the base stations are found in an iterative process. In this process, one station is assigned to serve as reference 305, and delays of the remaining base stations relative to the reference are found based on the relative time delays found for representative pairs of stations in the previous step 310. Erroneous and candidate pairs, as well as noise-like unreliable peaks taken into account are eliminated using the self-checking nature of the table of relative delays between the base stations. All that needs to be found are the delays between stations that form a contiguous path connecting all the stations, but not all possible pairs of stations, that can be easily derived from the relative time positions of the stations. A table (a matrix) of all possible delays between all the stations is compiled 315. The values are also put in a linear list and sorted in the order of time-delay values.

At this point, in one embodiment, it is possible to map (or otherwise display or store) the measurement points corresponding to the co-channel interference strength between each desired pair of base stations. In order to map or otherwise extract these data, a data-base query is built 320 that returns measurement points based on a number of criteria, such as relative levels and ranges of absolute power for interference, but also on the most important and specific criterion, which is the range of the relative time delays between signal components to be in certain windows around the list value and its complement to the pattern period. The windows are not too narrow, since in practice the characteristic (and stable) time delays between stations are significantly greater than propagation delays or symbol duration.

Figure 4:
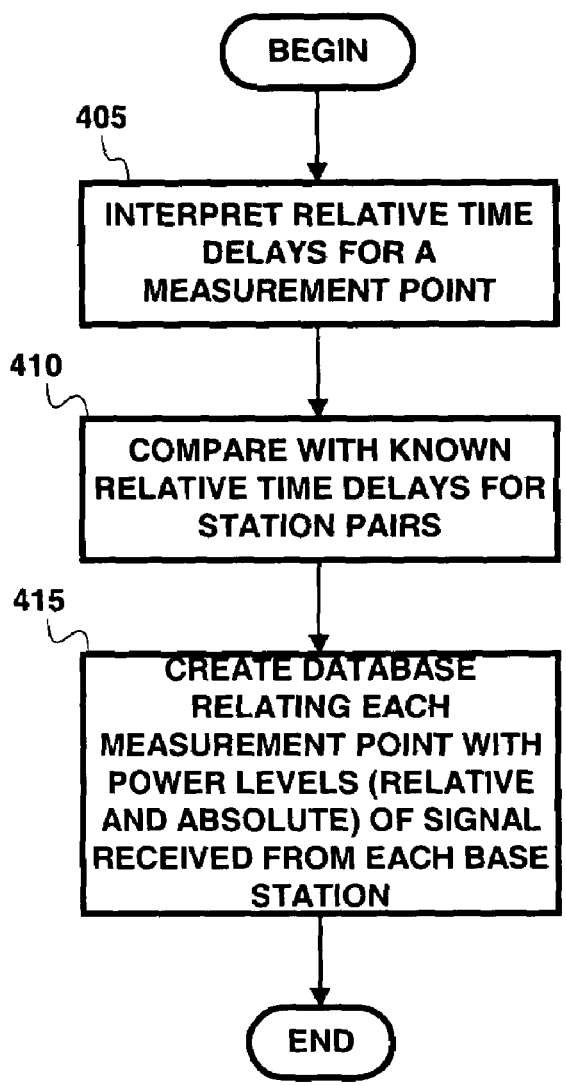
FIG. 4. illustrates a flowchart for a method according to an embodiment of the present invention for creating a database of the power of the signal from each base station contributing to a received signal at a measuring point.

In some cases using this embodiment, the relative delays between some pairs of station may be indistinguishable under the resolution time of the method (this depends on the pattern used). Referring to FIG. 4, another embodiment of the present invention is illustrated. In this embodiment, the identification of a number of signal components (correlation peaks) in each measurement point (or a subset of points based on the area of interest or other criteria) is accomplished by interpreting the relative time delays for the point 405 and comparing them with known relative delays for station pairs 410. A self-consistent interpretation of the delays virtually guarantees its correctness when the number of non-noise correlation peaks for each of the points is more than 3 or 4. In order to meet this requirement, the dynamic range of the correlation (processing gain) must be relatively high. This is achieved by correlating multiple known burst or training sequences, or by averaging the results of multiple correlations. At the end of this process, a data base is obtained that contains for each of the geographical measurement point a list of levels (relative and absolute) of received power from each of the base stations that contribute to the signal at this point 415. This database then is usable for a multitude of analyses including, but not limited to, optimizations, frequency planning, co-channel and adjacent-channel interference. Using this embodiment also provides the measurement of pass losses (or at least, separated power levels from each station rather than relative interference levels) that describe the network properties for subsequent optimization in an exhaustive manner invariant to any specific frequency plan in practicality.

A method and apparatus for uniquely identifying signal sources in a multisource signal has now been illustrated. It will also be understood that the invention may be embodied in other specific forms without departing from the scope of the invention disclosed and that the examples and embodiments described herein are in all respects illustrative and not restrictive. Those skilled in the art of the present invention will recognize that other embodiments using the concepts described herein are also possible.

What is claimed is:

1. A method for identifying signal sources in a multi-source signal area comprising:
   detecting a plurality of signals from a plurality of base station towers in a coverage area;
   measuring said plurality of signals from a plurality of locations in said coverage area;
   determining geographic coordinates of said plurality of locations;
   wherein said plurality of signals comprises a base station tower identifier that corresponds to a base station tower from which a particular signal originates;
   wherein measuring said plurality of signals from said plurality of locations further comprises measuring a relative signal delay that corresponds to specific timing of a given base station;
   creating timing relationships for the base station tower in said coverage area by creating at least one histogram of said relative signal delay; and
   producing a geographical data base of signal components from said plurality of base station towers that is clear of co-channel interference and adjacentchannel interference.

2. The method for identifying signal source as in claim 1, wherein the measuring of said plurality of signals is accomplished in a multiple frame window.

3. The method for identifying signal source as in claim 2, wherein said multiple frame window is 10 frames.

4. The method for identifying signal source as in claim 2, wherein said multiple frame window is 51 frames.

5. The method for identifying signal source as in claim 1, further comprising producing a reading of an absolute level of correlated power and relative time of arrival for each signal in said plurality of signals.

6. The method for identifying signal source as in claim 1, wherein determining geographic coordinates for said plurality of locations comprises using a GPS system.

7. The method for identifying signal source as in claim 1, wherein said base station towers are synchronized by a common core network.

8. The method for identifying signal source as in claim 7, wherein said base station towers have no appreciable drift relative to each other.

9. The method for identifying signal source as in claim 1, wherein measuring the plurality of signals from a plurality of locations comprises driving to the plurality of locations.

10. The method for identifying signal source as in claim 1, further comprising measuring said plurality of signals without interrupting said plurality of signals.

11. A method for identifying signal sources in a multi-source signal area comprising:
    detecting a plurality of signals from a plurality of base station towers in a coverage area;
    measuring said plurality of signals from a plurality of locations in said coverage area;
    wherein said plurality of signals comprises a base station tower identifier that corresponds to a base station tower from which a particular signal originates;
    wherein measuring said plurality of signals from said plurality of locations further comprises measuring a relative signal delay that corresponds to specific timing of a given base station;
    creating a measurement of timing relations for said base station towers in said coverage area by using a processing algorithm that uses said relative signal delays; and
    producing a geographical data base of co-channel interference strength between a given pair of base station towers from said plurality of base station towers.

12. The method for identifying signal source as in claim 11, wherein a single base station tower of said plurality of base station towers is used as a reference for said relative signal delay.

13. The method for identifying signal source as in claim 11, further comprising using said geographical data to analyze a signal in said coverage area to identify signal components.

14. The method for identifying signal source as in claim 13, further comprising using said analysis is used to calculate at least one of frequency planning, cochannel interference, adjacent-channel interference, mapping of said signal and optimization of said signal.

15. The method for identifying signal source as in claim 11, further comprising taking a second set of measurements in said coverage area and using and said analysis to create a database relating said second set of measurements to power level of said base station towers.

16. The method for identifying signal source as in claim 11, further comprising measuring said plurality of signals without interrupting said plurality of signals.

17. The method for identifying signal source as in claim 11, wherein the measuring of said plurality of signals is accomplished in a multiple frame window.

18. The method for identifying signal source as in claim 17, wherein said multiple frame window is 10 frames.

19. The method for identifying signal source as in claim 17, wherein said multiple frame window is 51 frames.

20. A method for determining power level of base stations in a coverage area with a plurality of base station towers comprising:
    compiling a set of measurements of received signals in said coverage area from a plurality of locations; and
    comparing said set of measurements to a database;
    wherein said database contains a geographical distribution of co-channel interference strength between given pairs of said base station towers among said plurality of towers, said geographical distribution being produced by comparing relative time of delay signals in said area of coverage using station tower identifiers.

21. A method for measuring co-channel interference and interference component separation based on statistical signal processing comprising:
- performing at least one drive test in a sample area containing a plurality of base tower stations that are transmitting a plurality of signals each with a known burst waveform;
- receiving said plurality of signals;
- correlating said plurality of signals using said known burst waveform;
- determining a time of arrival for each signal in said plurality of signals;
- recording said determination in a database;
- identifying each signal from the correlation of said plurality of signals;
- building a histogram based on differences in said time of arrival for each signal; and
- listing a time delay for each identified signal.

22. The method of claim 21, further comprising querying said database for each of said time delays and identifying pairs of interfering base tower stations among said plurality of base tower stations.

* * * * *